(12) United States Patent
Jang et al.

(10) Patent No.: US 9,137,424 B2
(45) Date of Patent: Sep. 15, 2015

(54) METHOD FOR FLICKER DETECTION IN IMAGE SIGNAL

(75) Inventors: Sung-Kyu Jang, Chungcheongbuk-do (KR); Pyeong-Woo Lee, Chungcheongbuk-do (KR)

(73) Assignee: INTELLECTUAL VENTURES II LLC, Wilmington, DE (US)

( * ) Notice: Subject to any disclaimer, the term of this patent is extended or adjusted under 35 U.S.C. 154(b) by 95 days.

(21) Appl. No.: 13/302,033

(22) Filed: Nov. 22, 2011

(65) Prior Publication Data

US 2012/0081571 A1   Apr. 5, 2012

Related U.S. Application Data

(63) Continuation of application No. 11/193,673, filed on Jul. 28, 2005, now Pat. No. 8,072,506.

(30) Foreign Application Priority Data

Jul. 29, 2004   (KR) .................. 10-2004-0059479

(51) Int. Cl.
*H04N 9/73* (2006.01)
*H04N 5/222* (2006.01)
*H04N 5/14* (2006.01)
*H04N 5/232* (2006.01)
*H04N 5/235* (2006.01)

(52) U.S. Cl.
CPC ............ *H04N 5/145* (2013.01); *H04N 5/2357* (2013.01); *H04N 5/23248* (2013.01); *H04N 5/23254* (2013.01); *H04N 5/23258* (2013.01)

(58) Field of Classification Search
CPC ..... H04N 9/045; H04N 5/23212; H04N 9/07; H04N 19/00157; H04N 19/00278; H04N 5/357; H01L 27/14625; H01L 27/14643; G06T 1/00; G06T 5/002; G06T 9/00
USPC ........................... 348/226.1–229.1, 370–371
See application file for complete search history.

(56) References Cited

U.S. PATENT DOCUMENTS

| | | | |
|---|---|---|---|
| 5,325,125 A | 6/1994 | Naimpally et al. | |
| 5,548,659 A * | 8/1996 | Okamoto | 382/107 |
| 5,819,035 A | 10/1998 | Devaney et al. | |
| 6,373,477 B1 * | 4/2002 | Van Dijk | 345/204 |
| 6,845,180 B2 | 1/2005 | Matthews | |
| 7,046,289 B2 | 5/2006 | Okisu et al. | |
| 7,106,368 B2 | 9/2006 | Daiku et al. | |
| 7,176,982 B2 | 2/2007 | Zhu et al. | |
| 7,187,405 B2 | 3/2007 | Poplin et al. | |
| 7,259,794 B2 | 8/2007 | Chang et al. | |
| 7,538,799 B2 | 5/2009 | Yanof | |

(Continued)

*Primary Examiner* — Twyler Haskins
*Assistant Examiner* — Carramah J Quiett
(74) *Attorney, Agent, or Firm* — McAndrews, Held & Malloy, Ltd.

(57) ABSTRACT

The present invention provides an effective flicker detection method performing a motion compensation. The present invention includes the steps of: calculating a luminance difference between neighboring pixels; summing up the luminance difference in a specific direction if the difference is greater than a threshold value; performing a motion estimation by using a sum calculated through step (b) to thereby calculate a motion displacement; performing a motion compensation to a current frame data by using the motion displacement; calculating a difference between a previous frame data and the compensated current frame data; and detecting the flicker by using the difference calculated in step (e).

20 Claims, 5 Drawing Sheets

(56) References Cited

U.S. PATENT DOCUMENTS

| | | |
|---|---|---|
| 2003/0142239 A1 * | 7/2003 | Yoshida et al. ............... 348/607 |
| 2004/0016919 A1 | 1/2004 | Daiku et al. |
| 2004/0047419 A1 | 3/2004 | Wakabayashi et al. |
| 2007/0146500 A1 | 6/2007 | Lee et al. |

* cited by examiner

METHOD FOR FLICKER DETECTION IN IMAGE SIGNAL

CROSS-REFERENCE TO RELATED APPLICATIONS

The present application is a continuation of U.S. patent application Ser. No. 11/193,673, filed Jul. 28, 2005, now U.S. Pat. No. 8,072,506, which claims priority to KR Application 2004-0059479, filed Jul. 29, 2004, both of which are hereby expressly incorporated herein by reference as though set forth in full.

FIELD OF INVENTION

The present invention relates to a flicker detection method in an image signal; and, more particularly, to an effective method for a flicker detection with performing a motion compensation between frames of image data constituted with plural image signals.

DESCRIPTION OF PRIOR ART

Charge-coupled devices (CCD) were the only image sensors used in a digital image medium until recently. However, there is a less expensive alternative, e.g., a complementary metal oxide semiconductor (CMOS) image sensor. The CCD sensors offer superior image performance and flexibility. However, the size of the CCD is large compare with the CMOS image sensor. On the other hand, the CMOS image sensors offer more integration, lower power dissipation, and smaller system size although image quality and flexibility of the CMOS image sensor are far below than the CCD. The CMOS image sensors are suitable to high-volume, space-constrained applications where image quality is not critical, e.g., a camera of a mobile telephone, a security camera, a PC peripheral, toys, and some automotive applications. However, great advances have been achieved and CMOS image sensors with quality comparable to CCD sensors can be produced. Because of the above mentioned advantages, the CMOS image sensor is, therefore, used extensively.

However, when various light sources are used for the CMOS image sensor, a flicker can be generated. When each line of a pixel array in the CMOS image sensor receives different light sources, each line has different luminance. Thus, an additional band is appeared in each line on an image. The additional band is called as the flicker.

FIG. 1 is a diagram explaining a case when a flicker occurs.

As shown, an amount of energy inputted to each line of a CMOS image sensor varies according to a quantity of inputted light and an exposing time of the CMOS image sensor. Due to a difference of the amount of energy inputted to each line, the flicker occurs in the CMOS image sensor. This flicker degrades a quality of the image. Thus, the flicker should be remedied to thereby improve the quality of the image.

There have been many efforts to remove the flickers. The most famous three methods are a method using a super resolution pixel, a frequency detection through a transform, and a method for removing the flicker by obtaining a flicker period through detecting a flicker factor from the image itself. However, the method using the super resolution pixel is hard to implement. The frequency detection is hard to find an accurate frequency. Further, the method of obtaining the period is difficult to detect only the flicker factor. Particularly, in order to detect a flicker from the image signal, a image difference between a previous frame image and a current frame image is frequently used. However, the image difference is caused not only by the flicker also by a motion, e.g., a hand tremble. Therefore, it is unreasonable to detect the flicker only by extracting the image difference.

SUMMARY OF INVENTION

It is, therefore, an object of the present invention to provide a flicker detection method performing a motion compensation.

In accordance with an aspect of the present invention, there is provided a flicker detection method for detecting a flicker from an image signal outputted through M×N pixels. Herein the M and N are natural numbers. The flicker detection of the present invention includes the steps of: (a) calculating a luminance difference between neighboring pixels; (b) summing up the luminance difference in a specific direction if the difference is greater than a threshold value; (c) performing a motion estimation by using a sum calculated through step (b) to thereby calculate a motion displacement; (d) performing a motion compensation to a current frame data by using the motion displacement; (e) calculating a difference between a previous frame data and the compensated current frame data; and (f) detecting the flicker by using the difference calculated in step (e).

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF INVENTION

Hereinafter, a method for detection of a flicker in an image signal in accordance with the present invention will be described in detail referring to the accompanying drawings.

The present invention is based on a method of detecting a flicker from an image. As above mentioned, the method should detect only the flicker from an image difference between a previous frame and a current frame including both the flicker and motions, e.g., a hand tremble.

Thus, in order to obtain a difference between a current frame and a previous frame, the present invention performs a motion estimation to thereby compensate the motions. By compensating the motions through the motion estimation, most distortion of image caused by the motions can be removed from the image difference and, thus, a difference caused by the flicker can be obtained accurately.

Meanwhile, if a frame memory is used for the motion estimation, a system size is increased. In order to reduce a required system size, the present invention performs a predetermined operation to thereby perform the motion estimation with small amount of data. Through the operation, the minimum data necessary for the motion estimation is selected and used for the motion estimation.

A flicker is occurred because a frequency of a light source and a frequency of an exposing time of a CMOS image sensor are different. Particularly, a fluorescent lamp is operated in a low frequency, e.g., 50 Hz or 60 Hz. Meanwhile, the exposing time of the CMOS image sensor is generally dozens of milliseconds (ms). Thus, when the fluorescent lamp is used for the light source of the CMOS image sensor, the flicker can be occurs.

The present invention detects the flicker as following sequence: obtaining a data required for a motion estimation; performing the motion estimation; performing a motion compensation; calculating a difference between a motion compensated data and a previous data; filtering the difference by using a low pass filter to thereby detect local minima of the difference; analyzing a distance of the two local minima to thereby obtain a period of the difference; and determining whether the flicker occurs or not by analyzing the period.

Figure 1:
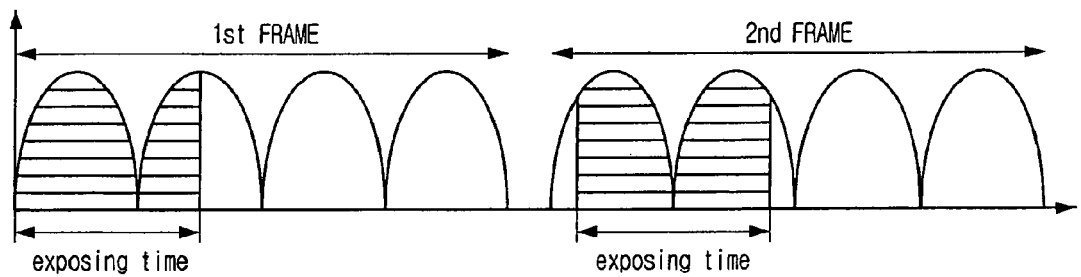
FIG. 1 is a diagram explaining a case when a flicker occurs.
Figure 2:
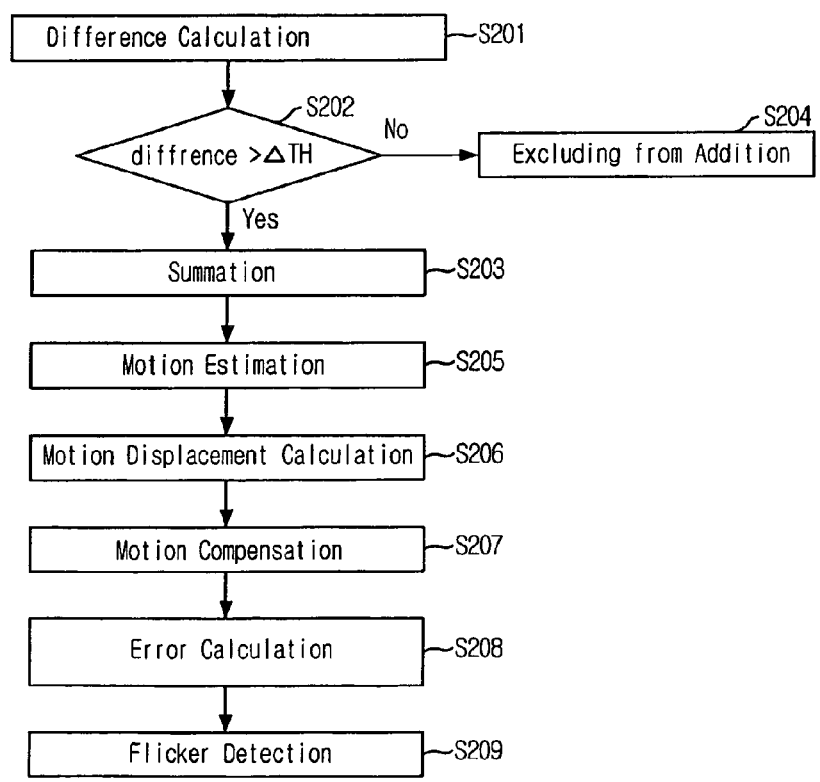
FIG. 2 is a flow chart describing a flicker detection algorithm in accordance with the present invention.

FIG. 2 is a flow chart describing a flicker detection algorithm in accordance with the present invention.

As shown, a method for detecting a flicker from an image signal outputted in M×N pixels is as follows (herein, the M and N are natural numbers): calculating a luminance difference between neighboring pixel data (S201); comparing the luminance difference with a threshold value ΔTh (S202); adding the luminance difference in a specific direction, e.g., a row direction and a column direction when the luminance difference is greater than the threshold value ΔTh (S203); discarding the luminance difference when the luminance difference is less than the threshold value ΔTh (S204); performing a motion estimation (S205); calculating a motion displacement MD (S206); performing a motion compensation about a present frame data by using the motion displacement MD (S207); calculating a difference between the compensated current frame data and a previous frame data in the specific direction, e.g., the row direction and the column direction (S208); and detecting the flicker by using the difference between the frame data (S209).

Passing through the steps S201 to S204, the flicker in the image signal is partially removed. Meanwhile, instead of comparing every pixel data in a frame, only the neighboring pixel data are compared to thereby calculate the luminance difference. Thus, the motion estimation can be performed by using one line memory instead of using the whole frame memory.

At the steps S205 and S206, before generating the motion displacement MD, a sum of absolute difference SAD is calculated by moving a search window in a search range while an initial position of the motion estimation which is randomly chosen is set as a standard. A minimum factor of the SAD is selected as the motion displacement MD.

At the step S207, the motion compensation of the current frame data is actually performed by moving the previous frame data as much as the motion displacement of the current frame data.

At the step S209, in order to detect the flicker, the difference between the frame data is low filtered to thereby find local minima of the difference. Then, by finding a distance between two local minima, a flicker period is calculated. The flicker period is compared with a predetermined detection period for thereby determining whether the flicker is occurred or not. If the flicker period coincides with the detection period, it is considered that the flicker is occurred.

Meanwhile, the motion estimation is used importantly in standards for coded representation of digital audio and video, e.g., MPEG-2, H.263, and H.264. The motion estimation refers a method of compensating displacements between consecutive video frames induced by moving objects and scene changes to thereby reduce the image difference between a current frame and a previous frame.

Figure 3A:
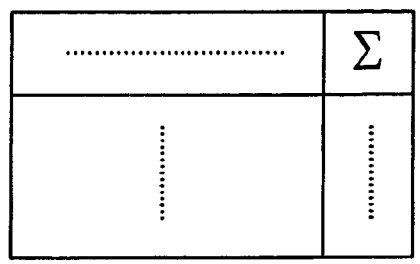
FIGS. 3A to 3C are diagrams explaining a data process method for use in a motion estimation.
Figure 3B:
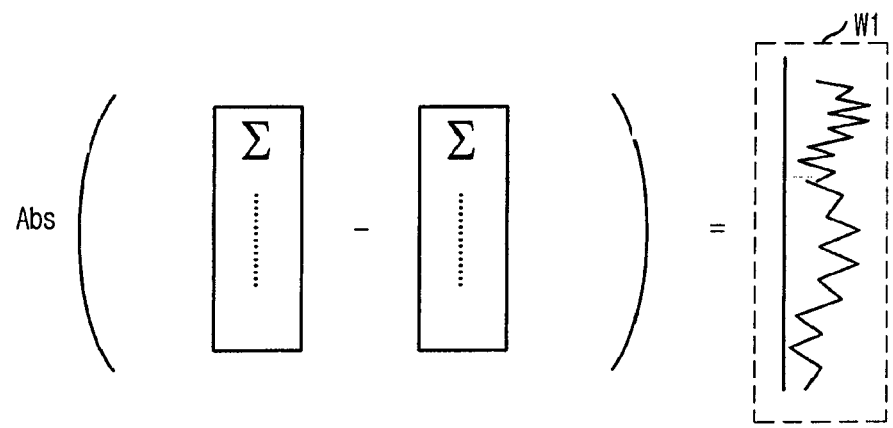
Figure 3C:
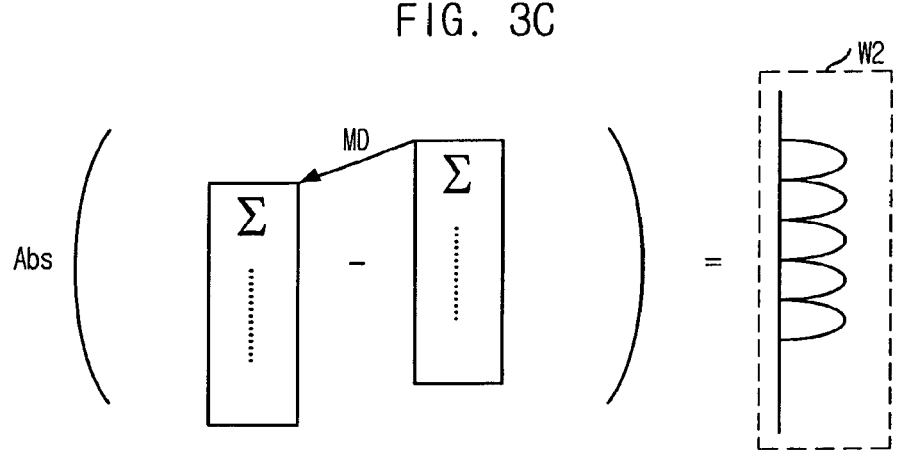

FIGS. 3A to 3C are diagrams explaining a data process method for use in the motion estimation.

Generally, a frame memory is required to perform the motion estimation. However, it is hard to implement a one-chip CMOS image sensor including the frame memory because a hardware burden is overgrown.

Instead of using the frame memory, the present invention uses a line memory for performing the motion estimation by adding a difference between each neighboring pixels in a specific direction, e.g., a row direction and a column direction. Herein, the present invention performs the addition in the row direction. However, it is hard to correctly perform the motion estimation only by adding pixel values in the row direction because the summation may distorts some of the pixel values important for the motion estimation.

Accordingly, a new data $S_T(j)$ for use in the motion estimation is defined by Equation 1 below.

$$S_T(j) = \sum_{i=1}^{L-1} \phi(p_{i,j,T}, P_{i-1,j,T}) \quad \text{(Eq. 1)}$$

In Equation 1, $p_{i,j,T}$ denotes a pixel arranged in an $i_{th}$ row and a $j_{th}$ column of a $T_{th}$ frame; L denotes a width of the frame; and j denotes a height of the frame. Further, a function Ø is defined by Equation 2 below.

$$\phi(a, b) \equiv \begin{cases} |a - b| & \text{if } |a - b| \geq \Delta_{Th} \\ 0 & \text{otherwise} \end{cases} \quad \text{(Eq. 2)}$$

Herein, $\Delta_{Th}$ denotes a predetermined threshold value.

A pixel having great difference with neighboring pixels, i.e., having a large |a−b| value also has a great difference with a previous pixel at the motion estimation. Therefore, due to Equation 1, it is allowable to add only pixels having large difference to thereby obtain the motion displacement MD. Further, the motion estimation can be performed more correctly by removing unnecessary values whose |a−b| is less than the threshold value $\Delta_{Th}$. Moreover, by obtaining the difference between the neighboring pixels, the motion estimation can be performed with a data that a flicker is removed, because the flickers between the neighboring pixels are almost the same. Accordingly, when the data $S_T(j)$ obtained via Equation 1 is used for the motion estimation, the less hardware is required for reliably calculating the motion displacement MD.

After collecting the current frame data and the previous frame data through Equation 1, the motion estimation is performed through the following Equation 3 below.

$$SAD(v) = \sum_{j=off}^{BS+off} |S_T(j) - S_{T-1}(j + v)|, \quad \text{(Eq. 3)}$$

$$v \in [-SR, +SR]$$

In Equation 3, 'BS' denotes a block size that the motion estimation will be performed; 'off' denotes an initial position of the motion estimation; 'SR' denotes the search range.

FIG. 3B describes the calculation of the difference between the frame data without compensating the motion displacement MD. As shown in W1, a result of the calculation without compensating the motion displacement MD is irregular wave form and, therefore, it is impossible to find a period.

FIG. 3C shows the calculation of the difference between the frame data with compensating the motion displacement MD to thereby detect the flicker. As shown in W2, a result of the calculation with the motion compensation has a predetermined period. This period is used to detect the flicker.

Figure 4:
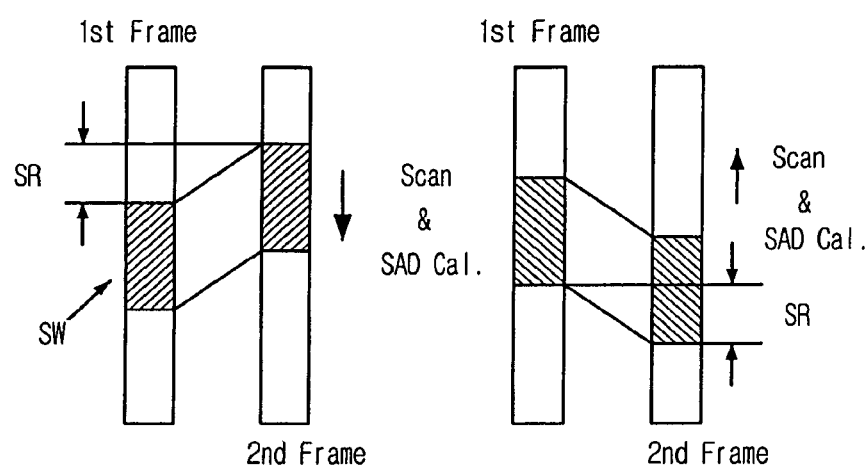
FIG. 4 is a diagram showing a motion estimation process.

FIG. 4 is a diagram showing a motion estimation process.

As shown, the motion estimation is performed by passing through a scan and a SAD calculation. Herein, an area drawn a deviant crease represents the search window SW, i.e., the block size BS. The search window SW can move bidirectionally, for example, from upside to bottom and vice versa as shown in FIG. 4.

When the SAD is defined as Equation 3, a final motion displacement MD is defined as follows.

$$MD = \arg(\min\{SAD(v)\}) \quad \text{(Eq. 4)}$$

In Equation 4, the minimum value of the SAD is able to be found by an operator 'min'. The final motion displacement MD value is determined by an operator 'arg' which returns an argument v having the minimum SAD value.

After the motion displacement MD is selected, the motion compensation is performed. The motion compensation does not use the data generated via Equation 1 but use a value generated by Equation 5 below.

$$U_T(j) = \sum_{i=1}^{L} p_{i,j,T} \quad \text{(Eq. 5)}$$

$U_T(j)$ is a sum of the pixels in one row of a certain frame.

Further, an error of the motion compensation is defined as follows.

$$\epsilon(j) = U_T(j) - U_{T-1}(j+MD) \quad \text{(Eq. 6)}$$

By using the compensation error $\epsilon(j)$, a flicker period is determined. Generally, Equation 6 includes many noises. Thus, before determining the flicker period, the noises are filtered by a low pass filter. If a period of local minima of the low filtered data, i.e., the flicker period corresponds to a predetermined detection period, the filtered data is determined as the flicker. When a number of the local minima whose flicker period is corresponding to the detection period in a certain frame is greater than a predetermined number, the corresponding frame is considered that the flicker is occurred.

Figure 5:
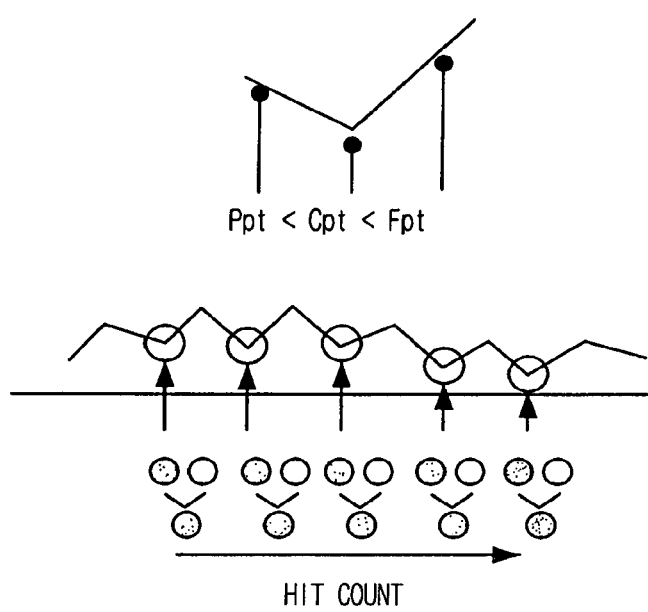
FIG. 5 is a magnified diagram of W2 shown in FIG. 3C.

FIG. 5 is a magnified diagram of W shown in FIG. 3C to thereby explain a detection of the flicker period by using the local minima of the compensation error and a determination of the flicker. Herein, Ppt denotes a previous value of a wave; Cpt denotes a current value of the wave; Fpt denotes a following value of the wave. When the current value Cpt is the least value from the Ppt, Cpt, and Fpt, the current value Cpt becomes the local minima. A period of the local minima, i.e., the flicker period is counted to thereby detect the flicker.

Meanwhile, local maxima can be used instead of the local minima. When the current value Cpt is most value from the Cpt, Ppt, and Fpt, the current value becomes the local maxima.

Figure 6:
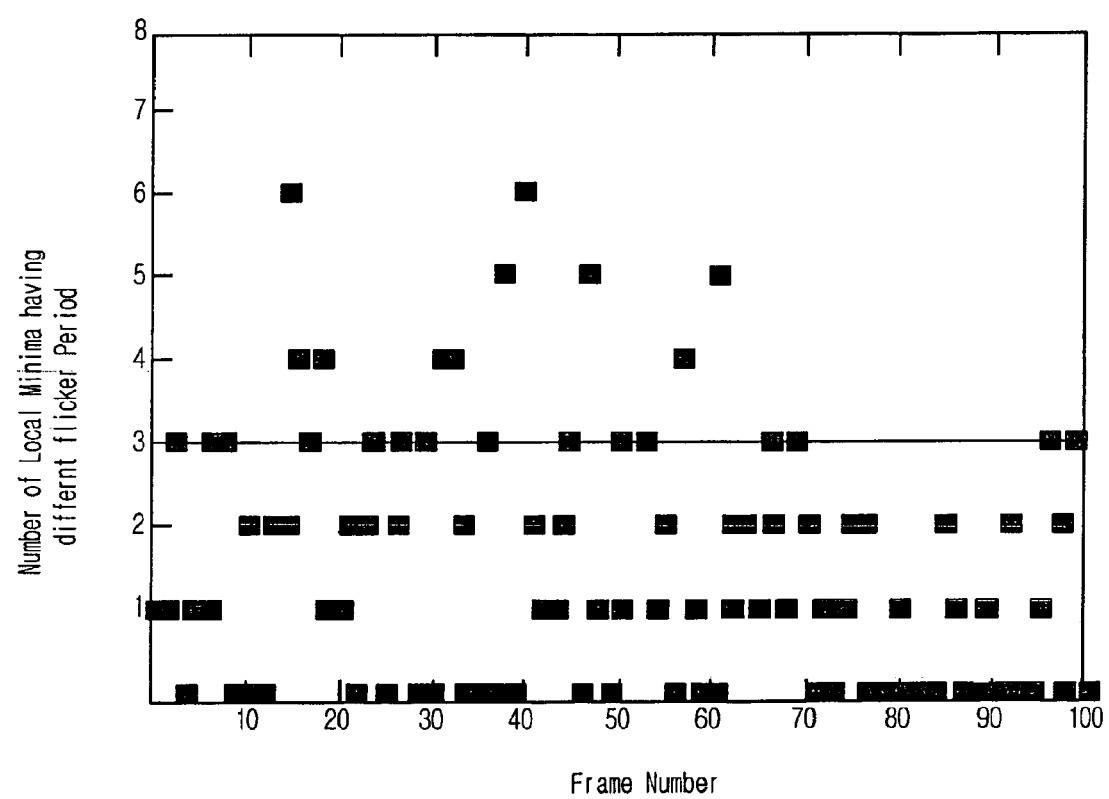
FIG. 6 is a diagram showing an operation result of the present invention.

FIG. 6 is a diagram showing an operation result of the present invention.

As shown, a horizontal axis represents a frame number; a vertical axis represents the number of local minima whose flicker period is different from the detection period. Herein, the flicker period is detected by the flicker detection method performing the motion compensation. If the number of local minima whose flicker period is different from the detection period in a certain frame is more than 3, it is determined that the frame does not include the flicker. As shown in FIG. 8, the present invention correctly detects the flickers in 89 frames of 100 frames.

As abovementioned, the present invention performs the flicker detection unlike the conventional art that detects the flicker simply by calculating the difference between the previous frame and the current frame. That is, the present invention compensates the motion, e.g., a hand tremble to thereby detect the flicker by using the compensated frame data. Accordingly, the present invention is able to detect the flicker reliably and, further, improve the quality of an image.

The present application contains subject matter related to Korean patent application No. 2004-59479, filed in the Korean Patent Office on Jul. 29, 2004, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A flicker detection method for detecting flicker in an image signal, the method comprising:
   using a computing device to perform the following:
   (a) determining luminance differences between neighboring pixels in a line of pixels;
   (b) comparing each luminance difference to a non-zero luminance threshold to determine whether each luminance difference is greater than the luminance threshold;
   (c) in response to determining that a luminance difference is greater than the luminance threshold, increasing a sum of luminance differences that are greater than the luminance threshold by the respective luminance difference;
   (d) performing a motion estimation using the sum to determine a motion displacement;
   (e) performing a motion compensation on a current frame data using the motion displacement to yield a compensated frame data;
   (f) determining a difference between a previous frame data and the compensated current frame data; and
   (g) detecting the flicker using the difference determined in step (f).

2. The method of claim 1, wherein the flicker is partially removed by steps (a)-(c).

3. The method of claim 1, wherein steps (a)-(c) use a line memory.

4. The method of claim 3, wherein step (a) determines the luminance difference between the neighboring pixels, and wherein each of the neighboring pixels are placed in neighboring two lines, respectively.

5. The method of claim 1, wherein the line of pixels is one of a row of pixels and a column of pixels.

6. The method of claim 1, wherein in step (d), an initial position of the motion estimation is decided depending on a search range.

7. The method of claim 6, wherein step (d) comprises:
   calculating a sum of absolute difference (SAD) from the initial position to a block size of a search window; and
   selecting the least SAD as the motion displacement.

8. The method of claim 1, wherein step (f) comprises determining a difference between the previous frame data and the compensated current frame data in a direction of the line of pixels of step (a).

9. The method of claim 8, wherein the direction is one of a row direction and a column direction.

10. The method of claim 1, wherein step (g) comprises:
filtering the difference between the previous frame data and the compensated current frame data to thereby detect a plurality of local minima; and
detecting a flicker period by using the local minima.

11. The method of claim 10, wherein the flicker period is used for determining whether flicker has occurred.

12. The method of claim 1, wherein step (f) comprises:
filtering the difference between the previous frame data and the compensated current frame data to thereby detect a plurality of local maxima; and
detecting a flicker period by using the local maxima.

13. The method of claim 12, wherein the flicker period is used for determining whether flicker has occurred.

14. A method comprising:
using a computing device to perform at least the following:
determining luminance differences between neighboring pixels in a line of pixels;
comparing each luminance difference to a luminance threshold to retain luminance differences greater than the luminance threshold and remove luminance differences less than the luminance threshold for a sum of luminance differences greater than the luminance threshold;
summing up the retained luminance differences that are greater than the luminance threshold to yield the sum of luminance differences greater than the luminance threshold; and
detecting flicker by using a difference between a previous frame data and a compensated current frame data.

15. The method of claim 14, further comprising performing a motion estimation using the sum to determine a motion displacement.

16. The method of claim 15, further comprising performing a motion compensation on a current frame data using the motion displacement to yield the compensated frame data.

17. The method of claim 16, further comprising determining a difference between a previous frame data and the compensated current frame data.

18. A method of detecting a period of a flicker in image data, the method comprising:
performing motion compensation on image data to produce motion-compensated image data; and
detecting the period of the flicker using the motion-compensated image data;
wherein performing motion compensation on image data includes:
performing motion estimation to determine a motion displacement; and
performing motion compensation on a current frame data using the motion displacement to yield a compensated current frame data.

19. The method of claim 18, wherein said performing motion compensation on a current frame data comprises moving a previous frame data a direction and amount indicated by the determined motion displacement to yield the compensated current frame data.

20. The method of claim 18 further comprising determining a difference between a previous frame data and the compensated current frame data, wherein the period of the flicker is detected using the determined difference.

* * * * *